United States Patent [19]
Chen

[11] Patent Number: 5,841,344
[45] Date of Patent: Nov. 24, 1998

[54] VEHICLE SECURITY SYSTEM WITH ANTI-ROBBERY FUNCTION

[75] Inventor: Michael Chen, Taipei Hsien, Taiwan

[73] Assignee: Advance Security Inc., Taipei Hsien, Taiwan

[21] Appl. No.: 886,033

[22] Filed: Jun. 30, 1997

[51] Int. Cl.⁶ .................................................. B60R 25/10
[52] U.S. Cl. ...................... 340/426; 340/425.5; 340/430; 307/10.3; 307/10.4
[58] Field of Search .................................... 340/426, 430, 340/425.5, 825.31, 825.34, 539, 542, 543, 576; 307/10.2, 10.3, 10.4, 10.5; 180/287

[56] References Cited

U.S. PATENT DOCUMENTS

| | | | |
|---|---|---|---|
| 4,093,870 | 6/1978 | Epstein | 340/576 |
| 4,866,422 | 9/1989 | Dunnett et al. | 340/539 |
| 5,079,435 | 1/1992 | Tanaka | 307/10.2 |
| 5,289,177 | 2/1994 | Wake | 307/10.2 |
| 5,412,378 | 5/1995 | Clemens | 340/426 |
| 5,559,505 | 9/1996 | McNair | 340/576 |
| 5,596,317 | 1/1997 | Brinkmeyer et al. | 307/10.2 |
| 5,708,308 | 1/1998 | Katayama et al. | 307/10.4 |

*Primary Examiner*—Brent A. Swarthout
*Assistant Examiner*—Van T. Trieu
*Attorney, Agent, or Firm*—Browdy and Neimark

[57] ABSTRACT

A vehicle security system with anti-robbery function which has a mainframe including a software stored in a CPU and preset code recorded in a permanent memory unit. A key receiving means is electrically connected to the mainframe and a contact-type relief key also provided with a corresponding code which must match the preset code in the permanent memory unit to start the engine of a vehicle. The key receiving means is provided with a button and at least one relay is housed in the mainframe. Once the button is pressed, the security system enters an anti-robbery mode, and after a preset period of time, the CPU will make the horn of the vehicle honk and the head light and direction indicating lights flash continuously. After the engine is stopped, the CPU uses the relay or relays to make the engine starting circuit inoperative so as to further control the power-on, engine starting, ignition and oil supply circuitries of the vehicle not to function, making the security system operated in a more secure and practical manner.

3 Claims, 7 Drawing Sheets

F I G. 1
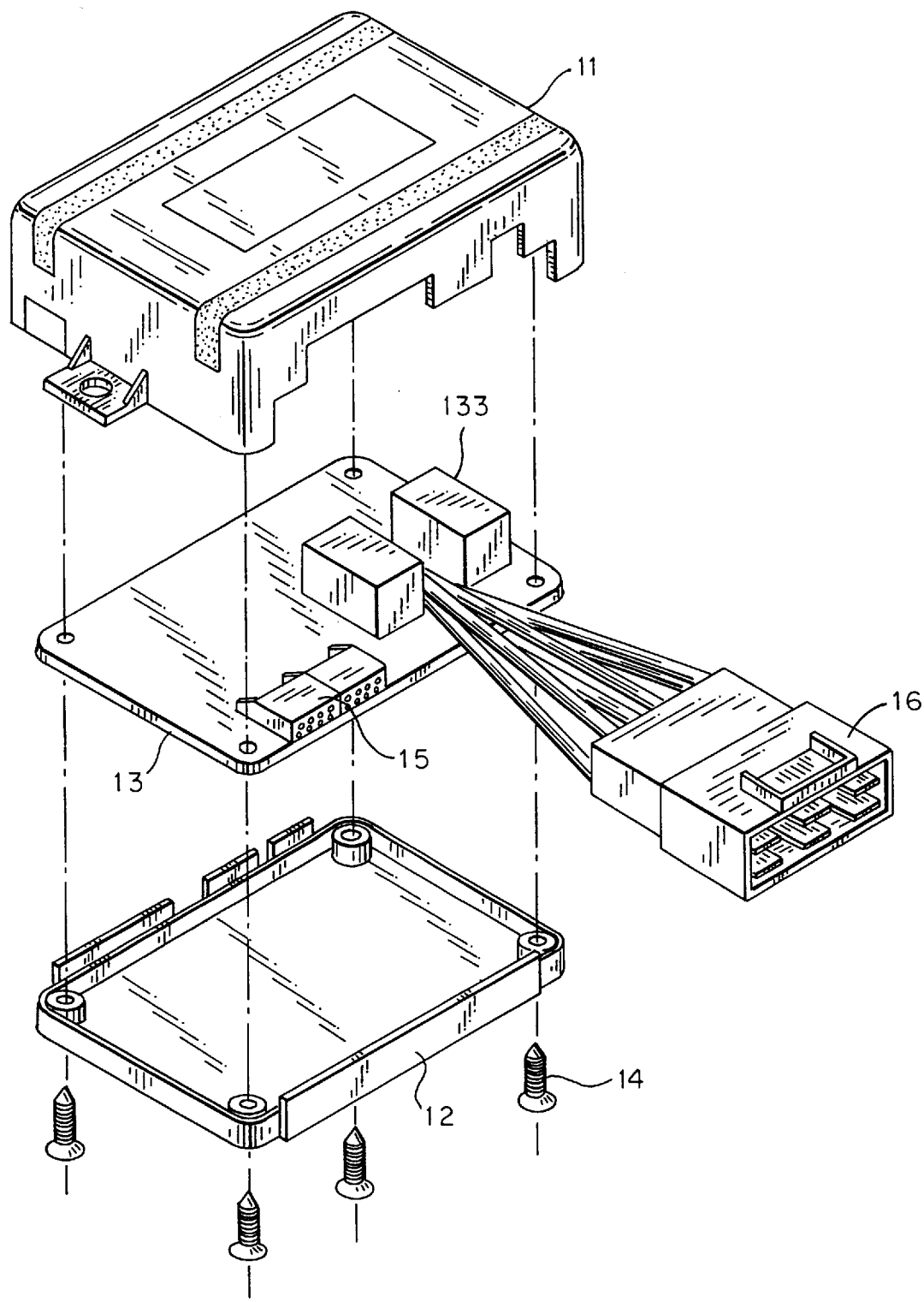

VEHICLE SECURITY SYSTEM WITH ANTI-ROBBERY FUNCTION

BACKGROUND OF THE INVENTION

The present invention relates to a vehicle security system with an anti-robbery function which has a mainframe including a software stored in a Central Processing Unit (CPU) and a preset code recorded in a permanent memory unit. A key receiving means is electrically connected to the mainframe and a contact-type relief key also provided with a corresponding code which must match the preset code in the permanent memory unit to restart the engine of a vehicle after terminating an anti-robbery mode. The key receiving means is provided with a button and at least one relay is housed in the mainframe. Once the button is pressed, the security system enters an anti-robbery mode, and after a preset period of time, the CPU will make the horn of the vehicle honk and the head light and direction indicating lights flash continuously. After the engine is stopped, the CPU uses the relay or relays to make the engine starting circuit inoperative so as to further control the power-on, engine starting, ignition and oil supply circuitries of the vehicle not to function, making the security system operated in a more secure and practical manner.

Most of conventional security systems mounted onto vehicles can only produce loud or noisy alarm sounds for warning purpose when a vehicle is robbed or stolen without taking further action to effectively guard the vehicle from being driven away.

In general, there are two kinds of security systems widely used on vehicles at present. One type of the security system is detection-oriented and the other type is control-oriented. The first type uses detecting means, such as electric current detectors, vibration detectors and infra-red detectors, to monitor the physical variations of a vehicle and produces loud noisy alarm sound when a vehicle set in an alarm mode is broken in by an illegal intruder. The other type is able to prevent a vehicle from being driven away by a burglar wherein a number of relays are used to control the engine starting circuit so that a burglar can not start, ignite and supply oil to the engine. The second type of security system can better protect vehicles from being driven away by burglars but it is still not effective enough to guard vehicles from being robbed away.

SUMMARY OF THE INVENTION

The primary object of the present invention is to provide an improved vehicle security system with anti-robbery function which can prevent a robbed vehicle from being driven away by robbers once the security system is set by a driver by simply pressing down a button.

Another object of the present invention is to provide an improved vehicle security system with anti-robbery function, in connection to the electrical system of a vehicle, which is equipped with a key receiving means in connection to a CPU based mainframe and a key having a code stored therein; the key must be inserted in the key receiving means to check if the code in the key conforms to a preset code in a permanent memory of the mainframe; only the codes match, the engine of the vehicle can be started so as to better protect a vehicle from being robbed away.

BRIEF DESCRIPTION OF THE DRAWINGS

FIG. 1 is a diagram showing the exploded components of the mainframe of the present invention;

DETAILED DESCRIPTION OF THE PREFERRED EMBODIMENT

Figure 2:
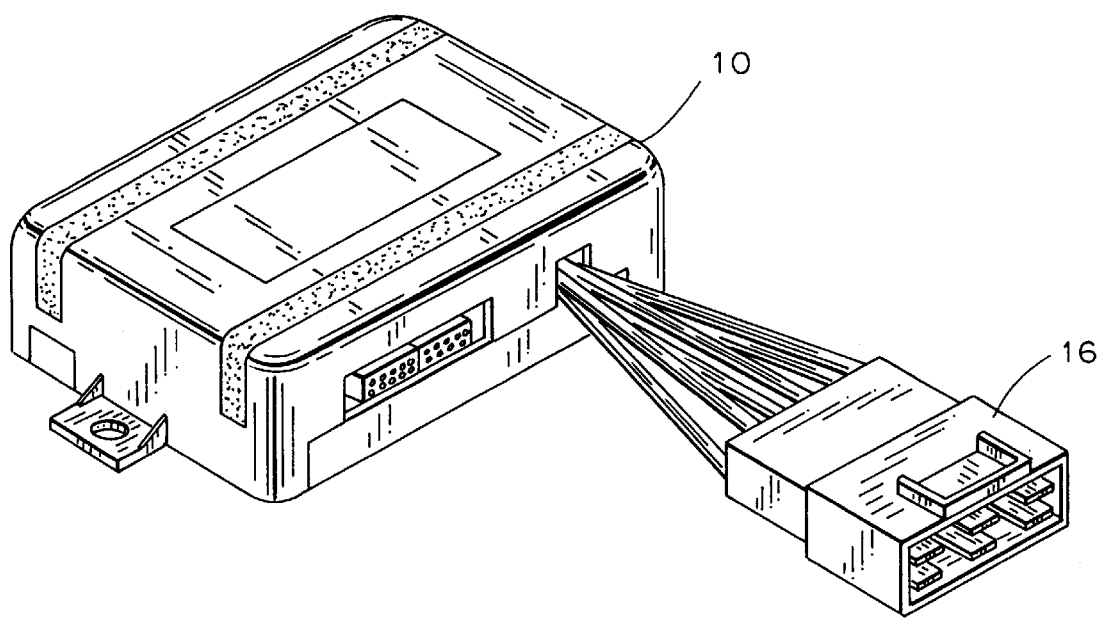
FIG. 2 is a diagram showing the assembled mainframe of the present invention.
Figure 4:
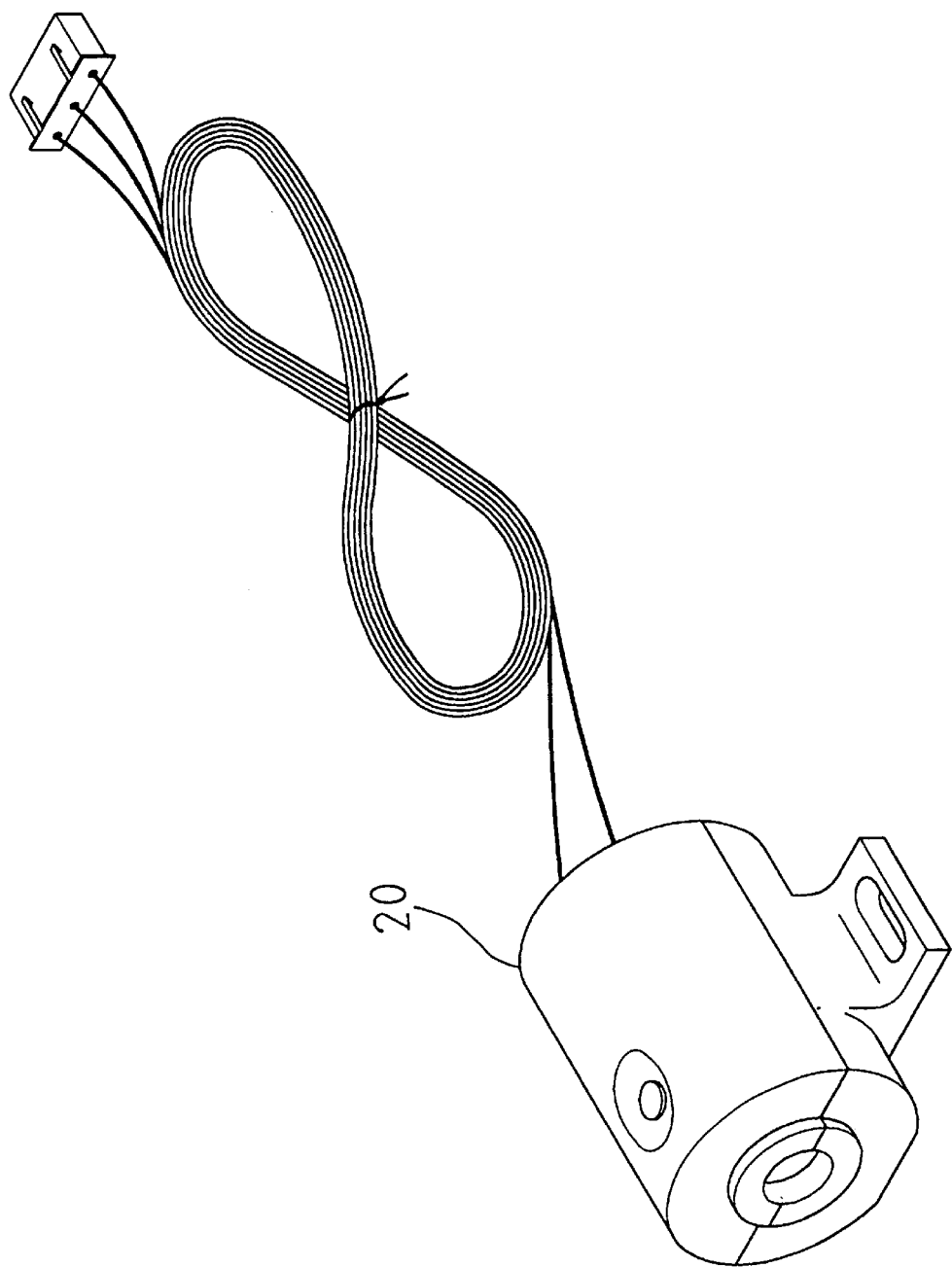
FIG. 4 is a diagram showing the assembled key receiving means thereof.
Figure 5:
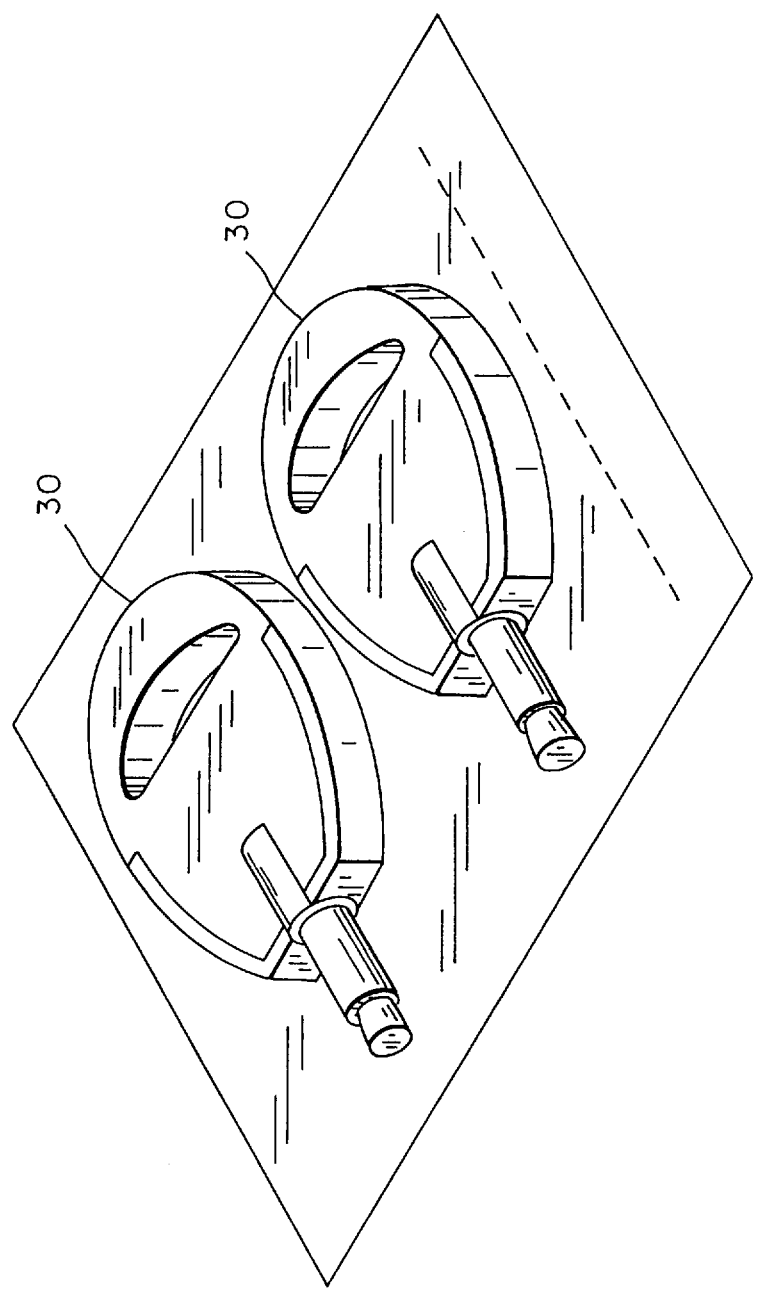
FIG. 5 is a diagram showing two identical contact-type relief keys of the present invention.

Referring to FIGS. 2, 4, 5, the vehicle security system with anti-robbery function of the present invention is mainly equipped with a mainframe 10, a key receiving means 20 and a contact-type relief key 30.

As shown in FIG. 1, the mainframe 10 is equipped with an upper lid 11, a lower casing 12 and a PC board 13 on which a programmable CPU 131 having software recorded therein is fixed, a permanent memory unit 132, relays 133 and a connection port 16 and other electronic components.

The software in the CPU 131 plays a dominant controller roll and the permanent memory unit 132 is used to store preset codes. The relays 133 are coupled selectively to the power-on, ignition and the engine starting of the ignition switch of a vehicle. A pair of sockets 15 and a connection port 16 are associated with the PC board 13. In assembly, the upper lid 11 and the PC board 13 and the lower casing 12 are joined together by screws 14 sequentially.

Figure 3:
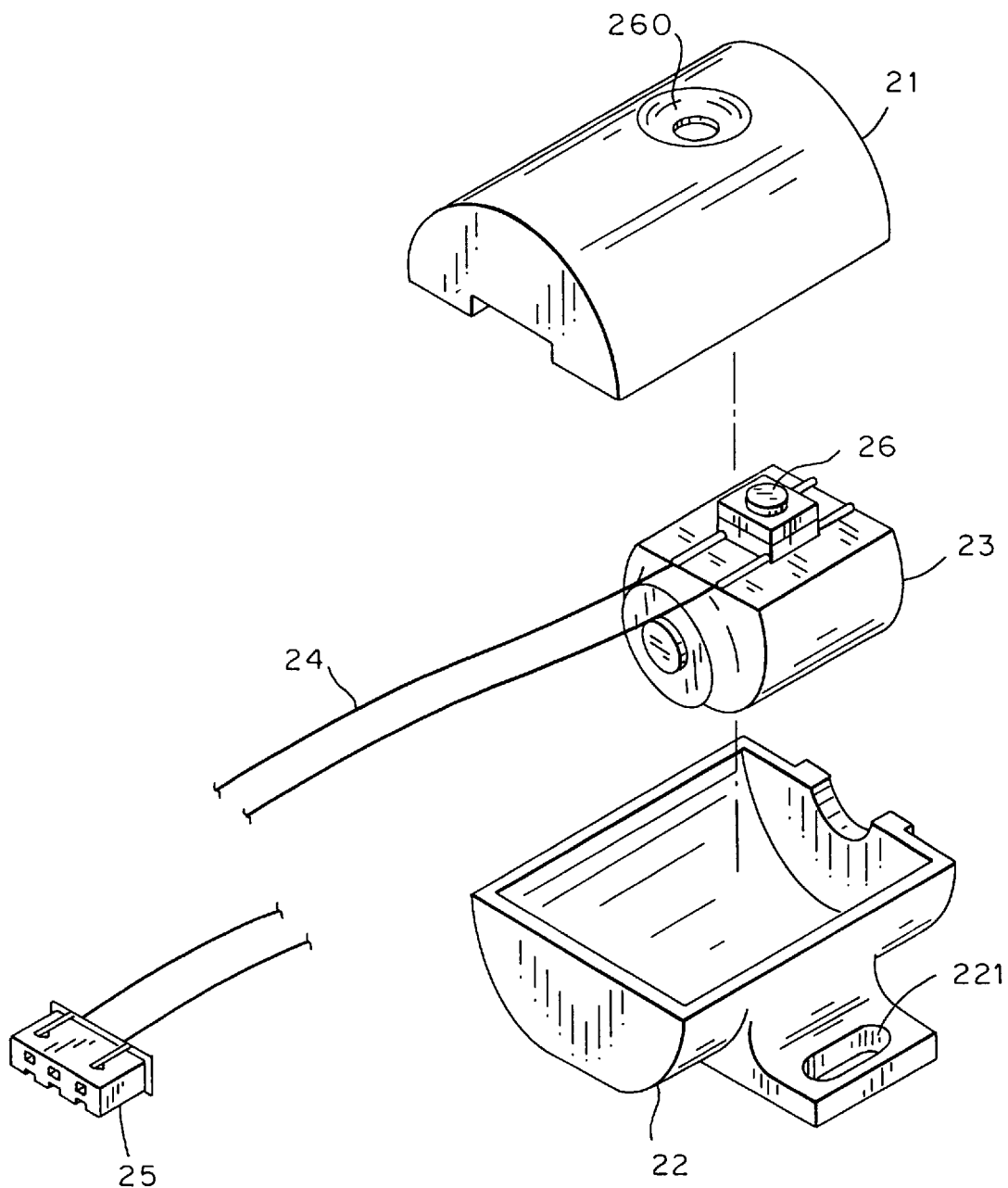
FIG. 3 is a diagram showing the exploded components of the key receiving means of the present invention.

Referring to FIG. 3, the key receiving means 20 includes an upper cover 21, a lower case 22, a key insertion device 23, two connecting wires 24, a connector plug 25 and a button 26 mounted on top of the key insertion device 23. The upper cover 21 is shaped in a half cylinder and has a button hole 260 near one end thereof for exposure of the button 26. The lower case 22 is of the same shape as the upper cover 21 and is provided with a securing slot 221 at one side thereof for fixing the same to a vehicle. The key insertion device 23 housed in the lower case 22 is coupled to the connector plug 25 by way of connecting wires 24.

The mainframe 10 is mounted onto a vehicle with the connection port 16 coupled to the electrical system of a vehicle, and the key receiving means 20 is electrically connected to the main frame 10 by way of the connector plug 25.

The contact-type relief key 30 having a code defined at the tip thereof and conforming to the preset code in the permanent memory unit 132. Once the contact-type relief key 30 is inserted into the key insertion device 23 of the key receiving means 20, the code of the key 30 is input into the mainframe 10 for comparison with the preset code in the permanent memory unit 132. Only the two codes match with each other, the engine of the vehicle equipped with the present security system can be started.

Figure 6:
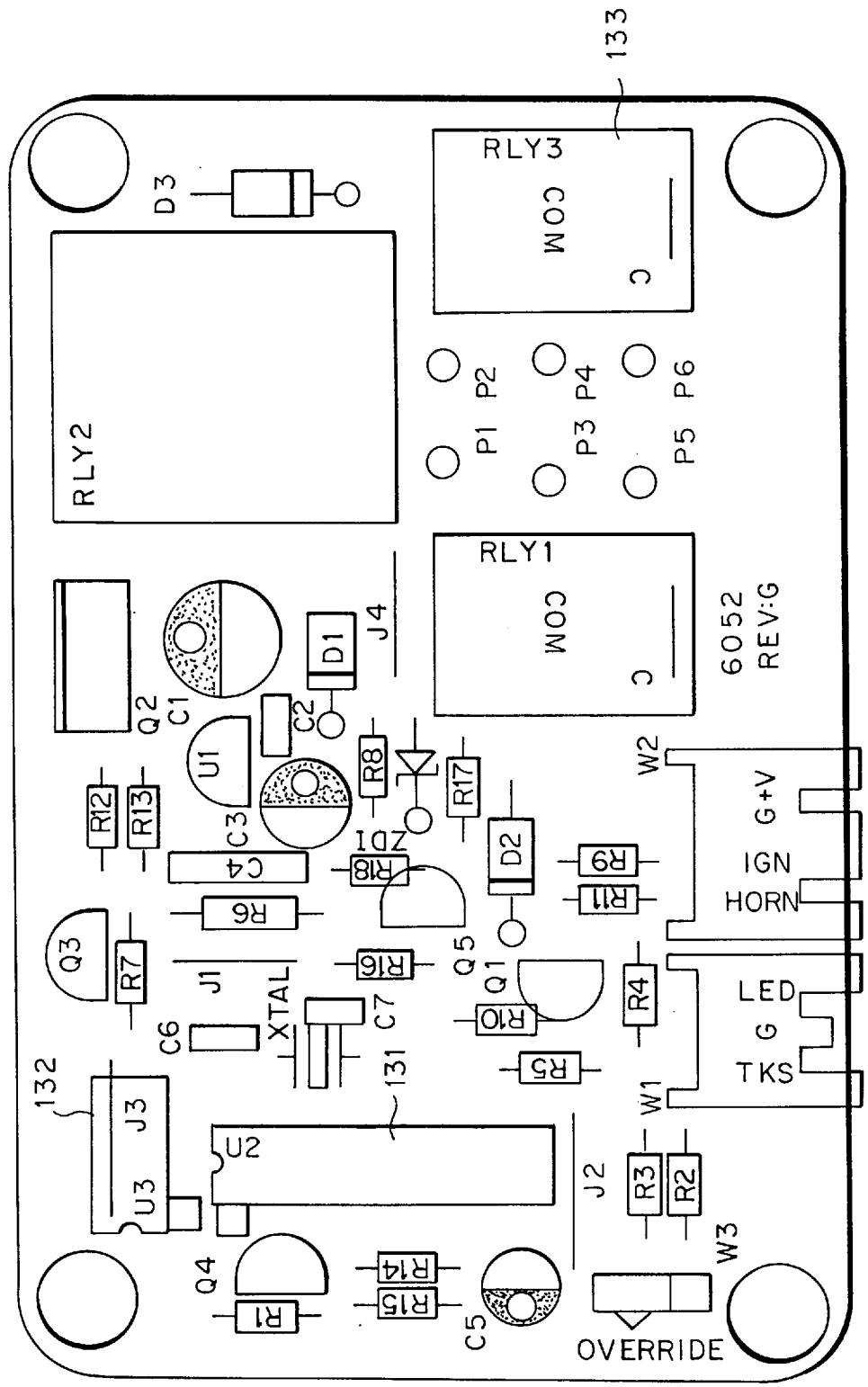
FIG. 6 shows the Printed Circuit (PC) board of the present invention.
Figure 7:
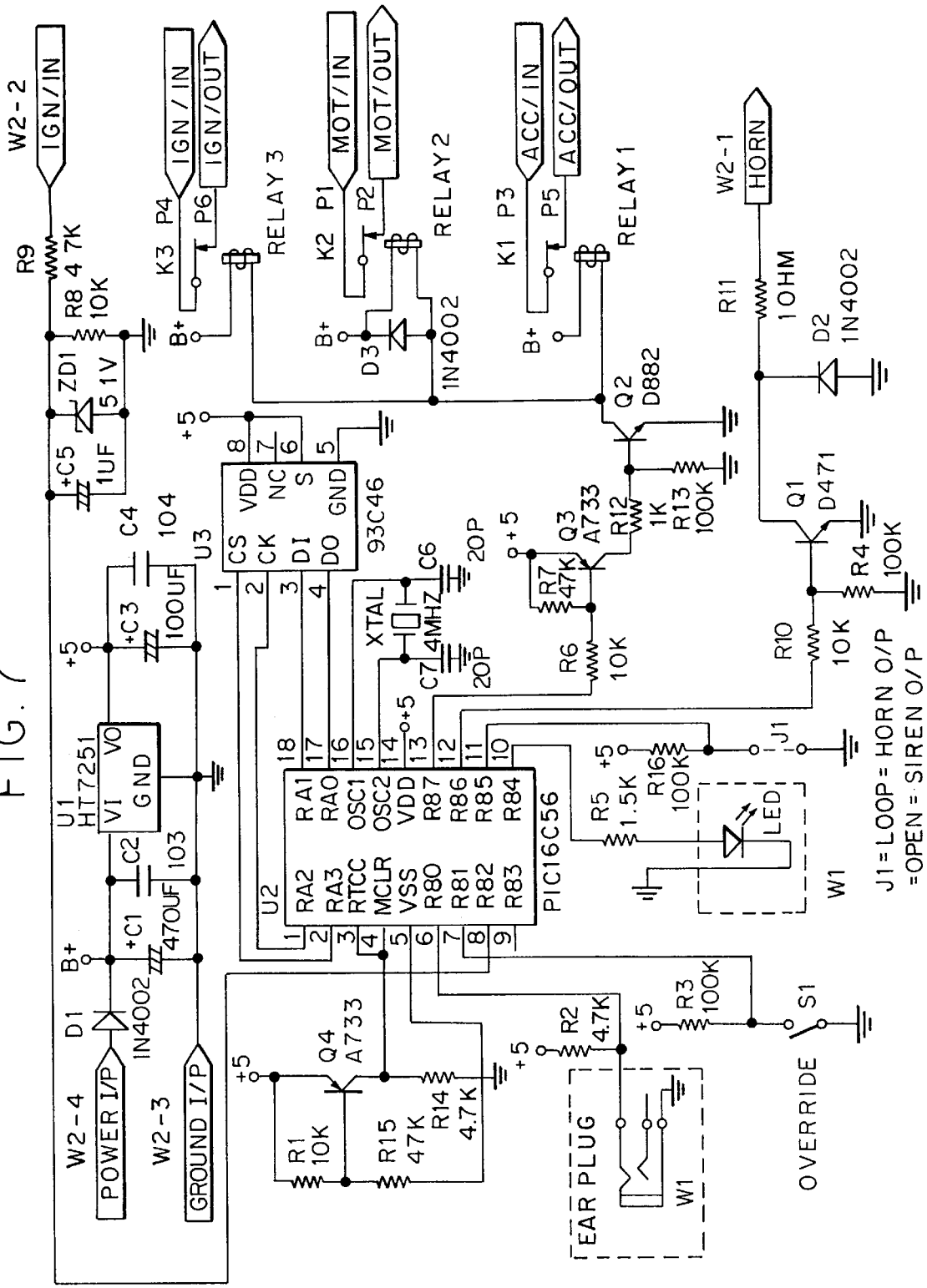
FIG. 7 is a diagram showing the detailed layout of the circuit of the present invention.

Referring to FIGS. 6, 7, the present invention stores a preset code in the permanent memory unit 132. The CPU 131 of the mainframe 10 is connected respectively to 3 relays 133 and a buzzer or siren. The relays 133 can control the opening and closing of the circuit of an engine so as to further control the power-on, ignition and cranking of an engine.

In other words, the contact-type relief key 30 and the permanent memory unit 132 of the mainframe 10 in connection to the key receiving means 20 are provided with an identical code and the inserted relief key 30 inputs its code for comparison with the preset code stored in the mainframe 10 via the key insertion device 24. The engine of a vehicle can only be operated with the two codes in conformance. In case a vehicle is robbed on the road, a driver can press the button 26 immediately to render the security system of the present invention in an anti-robbery mode. Accordingly, the software of the CPU 131 of the mainframe 10 can set in advance a period of time, 30 or 60 seconds for instance, and after the set time, the horn and siren will start to alarm without stop, and the head light and direction indicating lights will flash continuously to attract attention of passers-by and the above actions will only come to a halt when the engine of the vehicle stops. On the engine of the vehicle being stopped, the relays 133 will turn the ignition circuit of the engine into an open state so that the engine is guarded from being restarted again.

In case a vehicle is robbed on the move, the ignition key and the contact-type key 30 are both taken away, the driver only has to press immediately the button 26 on the key receiving device 23 to render the vehicle in an anti-robbery mode so that the security system begins to operate in the preceedingly described manner. Once the engine of a vehicle is out of ignition and the security system is still in an anit-robbery mode, even a robber has the ignition key and the contact-type relief key 30 at hand, the engine still can not be started because the robber has no knowledge about the procedure to remove the anti-robbery mode whereby the vehicle is completely guarded against being robbed away.

In case the button 26 is accidentally pressed to render the security system into an anti-robbery mode, a procedure particularly self set by the owner of the vehicle must be taken to remove the anti-robbery mode. The procedure includes the steps of using the ignition key to turn on the ignition circuit of the engine and the contact-type relief key 30 must repeatedly inserted in and pulled out of the key insertion device 23 a number of times within a fixed period of time (for example, 10 seconds), and turn off the ignition circuit of the engine by the ignition key within a preset time (for instance, 5 seconds) to terminate the anti-robbery mode. The number of times the contact-type key 30 being repeatedly inserted in and pulled out of the key insertion device 23 can be set in advance by the owner of the vehicle as a code. So, even a robber gets both keys in hand, the vehicle is still not under his control, if he does not know the procedure of how to terminate the anti-robbery mode.

It is apparent that the present invention equipped with an anti-robbery function allows a vehicle security system to guard a vehicle not only from burglars but also from robbers who can not drive a robbed vehicle away without the knowledge of how to take procedures to terminate the anti-robbery mode and the preset code made by the owner of the vehicle.

I claim:

1. A vehicle security system with anti-robbery function, comprising:

a mainframe having an upper lid, a lower casing and a Printed Circuit (PC) board having a Central Processing Unit (CPU) with a software recorded therein, a permanent memory and relays;

a preset code being stored in said permanent memory;

said relays being coupled respectively to a power-on circuitry, an ignition circuitry and an engine starting circuitry associated with an engine ignition switch of a vehicle;

a button controlled key receiving means including an upper cover, a lower half, a key insertion device, two connecting wires, a connector plug connected to a button by said two connecting wires and said button being mounted on top of said key insertion device;

said two connecting wires electrically connecting said key insertion device to said connector plug;

a contact-type relief key having a code identical to said code preset in said permanent memory unit stored at the front tip thereof;

said button controlled key receiving means being connected to said PC board of said mainframe by way of said conductor plug;

whereby when said contact-type relief key bearing a code is inserted in the key insertion device of said key receiving means, said code will be input into said mainframe for comparison with said preset code in said permanent memory unit; if said codes match with each other, the engine of said vehicle can be started; as the engine is started, said button disposed on top of said key insertion device is pressed down to render the vehicle into an anti-robbery mode; and after a period of time, said CPU will cause the vehicle's horn to alarm and head lights and direction indicating lights of said vehicle to flash continuously; in case the engine of said vehicle is stopped, said relays can set the ignition circuitry of said vehicle in an open state so as to prevent said power-on circuitry, said ignition circuitry and said engine starting circuitry controlled by said ignition switch of the vehicle from operation even with an ignition key and said relief key are used; said anti-robbery mode is removed by turning on said ignition switch and inserting said relief key in and pulling the same out of said key insertion device repeatedly a number of times, within a period of time and then turning off said ignition switch within a fixed period of time.

2. The security system as claimed in claim 1 wherein there are one, two or three relays used in said mainframe.

3. The security system as claimed in claim 1 wherein said contact-type key is inserted in and pulled out of said key receiving means repeatedly in a number of times in the process to terminate the anti-robbery mode of said security system, said number can be preset by a driver as a code.

* * * * *